United States Patent [19]

Tuttle

[11] Patent Number: 4,799,782
[45] Date of Patent: Jan. 24, 1989

[54] ADJUSTABLE EYE GLASS FRAME

[76] Inventor: John Tuttle, Box 873212, Wasilla, Ak. 99687

[21] Appl. No.: 70,569

[22] Filed: Jul. 6, 1987

[51] Int. Cl.$^4$ .............................................. G02C 5/20
[52] U.S. Cl. .................................................. 351/118
[58] Field of Search ...................... 351/111, 118, 119; 2/448

[56] References Cited

U.S. PATENT DOCUMENTS 4,153,348  5/1979  Walters et al. ...................... 351/118

FOREIGN PATENT DOCUMENTS 363886 10/1938 Italy .................................... 351/118

Primary Examiner—Rodney B. Bovernick
Assistant Examiner—P. M. Dzierzynski
Attorney, Agent, or Firm—Michael J. Tavella

[57] ABSTRACT

An adjustable eyeglass temple is disclosed that provides fast and easy adjustment. The primary adjustment mechanism is a two piece telescoping temple that is adjusted by a screw within the temple. The screw is accessible from the front portion of the temple allowing the temple to be adjusted while the eyeglasses are being worn. It is also possible for glass wearers to make the adjustments by themselves, while wearing the glasses. Two types of removal caps are disclosed. These caps cover the access port to the adjusting screw. One cap mearly acts to conceal the screw, while the other cap is fitted with a plug that engages the screw slot, thereby allowing adjustment of the temple without removing the cap.

Form fitting ear and nose pads are also disclosed. These pads will conform to the surface they contact, in the presence of body heat, and then set rigidly in the form fitting shape. Alternatively, oil-filled membranes can be substituted for the form fitting material.

15 Claims, 1 Drawing Sheet

ADJUSTABLE EYE GLASS FRAME

BACKGROUND OF THE INVENTION

This invention relates to adjustable eye glass frames, and more particularly to adjustable eye glass frames having telescoping ear pieces.

Today, millions of people wear eye glasses, not only to correct vision, but also to filter sunlight, and for safety when working in factories, for example. The two most important aspects of making a usable pair of glasses are the proper grind of the lenses, and the proper sizing of the frame. Although adults usually have minor difficulty in finding proper frames, this is not always the case, especially when the glasses are used on a worksite for safety reasons. These glasses can be used with many different employees and will tend to be difficult to fit the vast majority of employees. A much larger problem arises when glasses are needed for children. Since children grow quickly, it is possible that a child may outgrow a frame in less than one year. Constantly upsizing glass frames can become expensive.

In the past, several attempts to provide means of adjusting frames have been patented. U.S. Pat. No. 1,252,126, to Letzeisen discloses a frame having a wire temple. The temple was slidably attached to the frame with a locking adjusting screw. This adjusting screw can be loosened to allow the temple to slide back and forth until the desired length of temple is found. The nut can then be locked in place, restraining the temple. U.S. Pat. No. 1,841,052 to Pollmiller, U.S. Pat. No. 1,751,804 to Fischer, U.S. Pat. No. 2,503,275 to Klienman, and U.S. Pat. No. 2,856,813 to Kudelko all disclose eye glass adjusters utilizing some type of adjusting screw mechanism to adjust the temples. In these patents, the temples are fitted with an adjusting screw portion fitted into a threaded portion. As the adjusting screw is turned, the earpiece is either extended or retracted from the temple. Typically, these devices include some type of locking mechanism to provide the temple from moving thereby changing the distance setting. U.S. Pat. Nos. 3,584,938 and 4,153,346 disclose an alternate means of adjusting the temples. These devices utilize sliding bars having discrete position settings to make the adjustments. In these devices, the temple is held with a pin that secures the bar. The pin is then removed, the bar either extended or retracted until a new set position is aligned with the pin hole, and the pin is replaced.

The biggest drawback to all of these decives is that they all must be adjusted when they are off of the wearer's head. This requires the wearer or the fitter to place the frame on the wearer's head, check the fit, remove the frame, make an adjustment, check the fit, remove the frame, make adjustments and so on.

Another drawback of the fixed slide-pin devices is that the pins provide fixed sizes which limit their use in many cases and will not provide exact fits in many cases.

A secondary problem related to proper fit deals with ear piece and nose pad construction. Typically, these components are made of hard plastic. Occasionally, they may be padded either directly, or with stick on pads. Ill fitting ear pieces and nose pads leave unsightly marks on the nose, and can lead to sores on the ears.

It is an object of this invention to provide adjustable glasses that can be adjusted while the user is wearing them.

It is another object of this invention to provide adjustable glasses that do not have excessively sized or weighted temples as a result of the addition of the adjusting mechanism.

It is yet another object of this invention to provide an adjustment means for glasses that is totally concealed.

It is yet a further object of this invention to produce adjustable glasses having adjustment means that do not interfere with the operation of the temple hinges.

It is yet a further object of this invention to produce adjustable glasses that have a self locking adjustment mechanism.

It is yet a further object of this invention to produce adjustable glasses having body conforming ear pieces and nose pads to maximize fit and comfort for the user.

BRIEF DESCRIPTION OF THE INVENTION

The invention consists of a standard frame pair of glasses having adjustable temples. The temples are controlled by a screw-thread mechanism embedded within the temple. Unlike the prior art, this mechanism is adjusted from the front of the temple. In this manner, the glasses can be adjusted while being worn to assure a fast, proper fit. The telescoping ear piece is designed to be self locking by making it oval, rectangular, square or similar shape that will not rotate within the temple frame.

The adjusting screw mechanism is recessed within the front part of the temple. This allows a decoratve cover to be snapped in place over the adjusting screw, thereby concealing it from view. The cover can be quickly snapped out and the adjusting screw can then be adjusted as necessary.

The present invention overcomes the difficulties of ill fitting ear pieces and nose pads by constructing these components from a heat activated thermal setting material, or an oil filled membrane. The heat activated material will soften and conform to a shape when first placed in contact with body heat. Once the material sets, it is locked to that configuration, providing a customized personal fit for the ear and nose pieces.

DETAILED DESCRIPTION OF THE INVENTION

Figure 1:
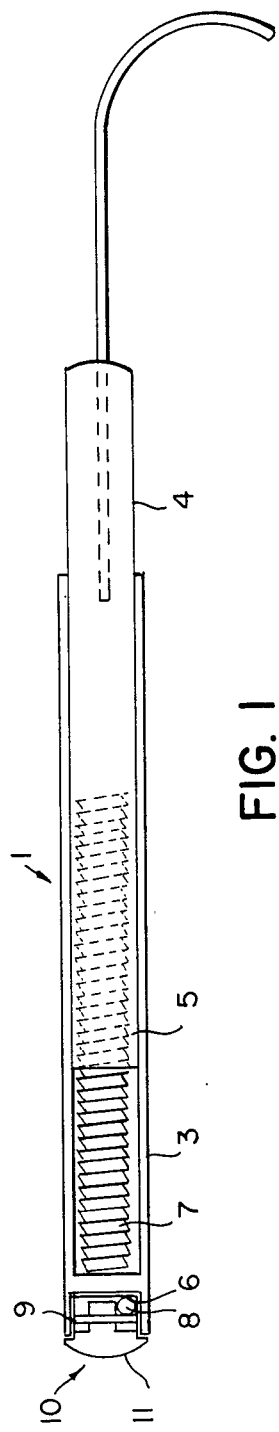
FIG. 1 is a side view showing a cut-away view of the adjustable tample.
Figure 2:
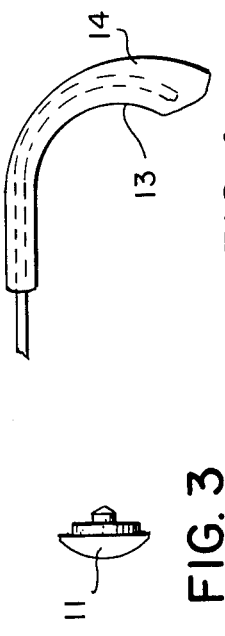
FIG. 2 is a front view of the frame showing a detail of the adjusting screw.
Figure 4:
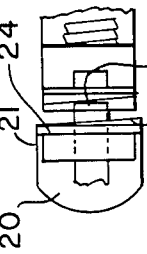
FIG. 4 is a detail of the shape conforming ear piece.

Referring now to the drawing figures, and more particularly to FIG. 1, the invention consists of an adjustable glass frame temple 1, attached to a glass frame 2 (shown in FIG. 2). The temple 1 has two main components. The first is the receiving barrel 3, which receives the telescoping ear piece 4. The telescoping ear piece 4 is designed to extend from and retract into the receiving barrel 3. The telescoping ear piece 4 has a threaded femal receptical 5 in the end that is placed in the receiving barrel 3. An adjusting screw 7 is designed to engage the female threads in the recepticle 5. The receiving barrel 3 has a retainer 6 placed at the end of the barrel 3, opposite from the receiving end as shown. The retainer 6 is used to retain the head 8 of the adjusting screw 7. The head 8, is restrained by the retainer 6 to force the telescoping earpiece 4 to be retracted into the receiving barrel 3. A nylon washer 9 is placed on the outer portion of the receiving barrel 3 as shown. The nylon washer 9 is used as a second retainer to prevent the screw 7 from being pulled out of the retaining tube 3 when the screw 7 is turned in the counter-clockwise direction. The nylon waster 9 is secured by a small bead of glue, or is fastened in other means comon to the art to prevent its removal from the retainer barrel 3.

Figure 6:
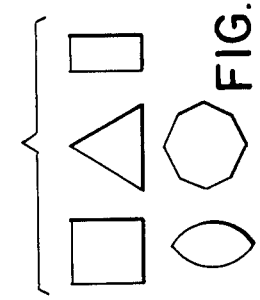
FIG. 6 is a detail of typical designs for the self-locking earpiece.

The telescoping earpiece 4 is designed to be self-locking within the receiving barrel 3. This prevents the telescoping ear piece 4 from rotating and thereby adjusting the length of the temple 1. In the preferred embodiment, the self-locking feature is provided by making the telescoping ear piece 4 in an oval shape, as shown in FIG. 6. Other designs for the telescoping ear piece 4 include rectangular, octagon and triangular. Representative shapes are also shown in FIG. 6.

The hinge end 10 of the receiving barrel 3 has a recessed portion to allow the adjusting screw 7 to be recessed in the barrel 3. A decorative cap 11 is also provided to conceal the adjusting screw 7. The cap 11 is designed to fit with the recess of the receiving barrel 3 and to fit flush with the front portion of the frame 2. The cap 11 also acts to prvent inadvertent access to the adjusting screw 7. The cap is flared slightly at its base to ensure a tight fit within the recess of the receiving barrel. This prevents the cap from accidently falling out of the recess during normal activity. The cap 11 is also provided with a plug, as shown, which is designed to fit into the slot of the adjusting screw, thereby further preventing accidental turning of the screw 7.

Figure 7:
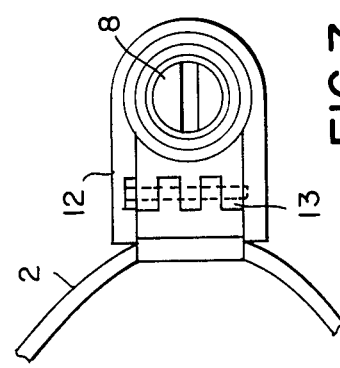
FIG. 7 is a detail of the square slot design of the adjusting screw.

Although a standard slot screw can be used (as shown if FIG. 7), the adjusting screw head 8 is not fitted with a standard slot. It has a square slot as shown in FIG. 7. The square slot enables the user to align the length of the temple because the square slot can be aligned by feel, whereas an ordinary slot could prove problematic. A square head screw driver is needed to operate this screw.

The adjusting screw 7 has fine threads to allow for small adjustments in temple length. Using the fine threaded screw allows for a greater level of adjustment compared to the slot-pin methods discussed above.

Figure 3:
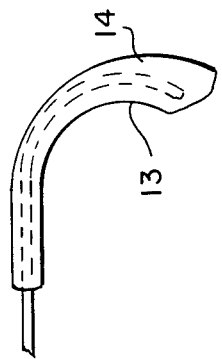
FIG. 3 is a side detail view of the removable decorative cap that covers the adjusting screw.

As shown in FIG. 3, the hinge piece 12 of the temple is extended from the sdie of the frame 2 to allow for the placement of the adjusting screw 7. A standard hinge 13 is provided on the temple 1 to connect the temple to the frame 2.

The opposite end of the telescoping ear piece 4 is designed to fit around the ear, in the customary manner. To ensure a proper fit, the ear piece must extend around the ear, covering 65 percent of the ear curve. The ear pad 14 of the telescoping ear piece 4 is provided with a cusion to prevent irritation of the ear surface. In the preferred embodiment, the preferred material for the ear pad 13 is a thremal setting material. This material is designed to soften when heated to allow it to conform to the ear surface. Once the material has set, it retains this contour, providing a customized fit for the wearer. Another pad can also be used. This pad consists of an oil filled membrane which will conform to the shape of the surface that it is in contact with.

Figure 5:
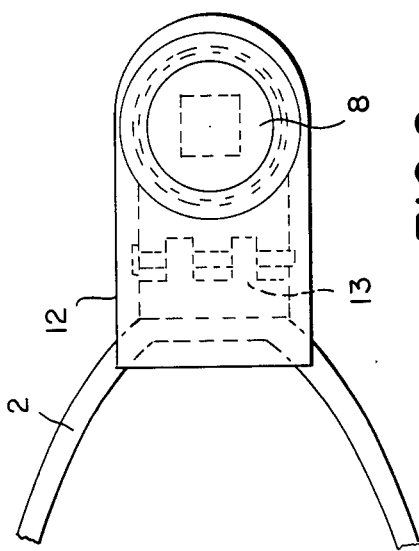
FIG. 5 is a detail of the shape conforming nose pad.

Referring now to FIG. 5, the same thermal setting material is also formed into nose pads 15. As in the case of the ear pad 14, the nose pads 15 are designed to form fit to the wearer's nose. The custom fit pads provide greater comfort and reduce the tendency to produce pressure marks on the wearer's nose.

Figure 8:
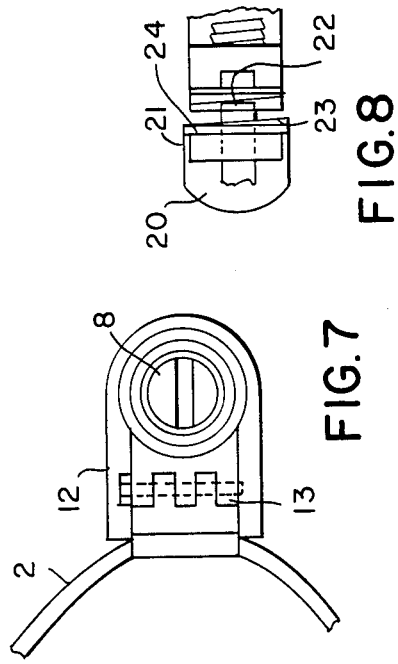
FIG. 8 is a detail of a second cap design for automatic adjustment of the temples.

A second form of cap can also be used. This cap eliminates the need for special screwdriver, and also eliminated the possibility of accidently losing a cap when the glasses are being adjusted referring now to FIG. 8, the cap 20 has a circular shape. A plug 22 extends out from the back of the back portion of the cap 20. A washer 21 is attached to the plug 22. The washer 21 is used to retain the cap within the receiver barrel 3. The plug 22 is designed to slide freely through the washer 21. The cap 20 is designed to be depressed into the receiving barrel 3 until the plug 22 engages the slot on the screw head 8. A spring 23 is fitted within the receiving barrel 3 as shown. It is restrained by the nylon washer 9 and a retaining washer 24, which is fixed to the plug 22. The spring 23 is used to prevent the cap 20 from entering the receiving barrel 3 until sufficient pressure is applied to the cap. Normally, the plug 22 does not engage the slot on the screw head 8. To adjust the temple, the cap 20 is depressed into the retaining barrel 3 until the plug 22 engages the slot. The cap can then be rotated in the proper direction as needed until the temple is at the desired length. The cap 20 is then released, and the spring 23 returns the cap to its normal position.

The device is used by placing the eyeglasses on the wearer and having either the user or another person make the adjustments. The cap is removed from the front of the temple (in the preferred embodiment), revealing the adjusting screw. The square headed screw driver is then inserted into the adjusting screw and the adjusting screw is rotated either clockwise or counterclockwise until the telescoping ear piece is set at the desired length. The screw can then be covered by the cap and the glasses can be worn normally. Alternatively, the glasses can also be adjusted by using the spring loaded cap as discussed above. The glasses can be further adjusted up to the limits of the adjusting screw, as needed.

It is intended that the present disclosure should not be construed in any limited sense other than that limited by the scope of the claims having regard to the teachings herein and the prior art being apparent with the preferred form of the invention disclosed herein ane which reveals details of structure of a preferred form necessary for a better understanding of the invention and may be subject to modification by skilled persons within the scope of the invention without departing from the concept thereof.

I claim:

1. An adjustable eyeglass temple, hingeably attached to an eyeglass frame, comprising
    (A) a temple ahving a front hinge adjusting tube and a rear ear piece adjusting tube, said rear ear piece adjusting tube being slidably disposed within said front hinge adjusting tube such that said rear ear piece adjusting tube can telescopically expand therefrom and retract thereto;
    (B) adjusting means fixedly installed within said front hinge adjusting tube and removably installed within said rear ear piece adjusting tube such that the overall length of said temple can be shortened or lengthened by said adjusting means, said adjusting means being only accessible for adjustment from the front of said temple.

(C) concealment means removably disposed and installed to conceal said adjustment means from view during normal use of the eyeglasses;

(D) locking means disposed within said rear ear piece adjusting tube such that said locking means prevent the rotation of said rear ear piece adjusting tube to prevent inadvertent adjustment of the length of said temple.

2. The device of claim 1 wherein said adjustment means comprise a screw fixedly installed within said front hinge adjusting tube, said screw also being rotatable therein; and female screw threads fixedly installed within said rear ear piece adjusting tube, said female screw threads being engaged by said screw such that as said screw is rotated clockwise, said rear ear piece adjusting tube is drawn into said front hinge adjusting tube, thereby making the overall length of the temple shorter; and when rotated counter-clockwise, said rear ear piece adjusting tube is forced out of said front hinge adjusting tube, thereby making the overall length of the temple longer.

3. The adjustable eyeglass temple of claim 2 wherein the locking means comprise forming the shape of the rear ear piece adjusting tube such that the shape is non-circular and conforming to the shape of the inside of said front hinge adjusting tube.

4. The adjustable eyeglass temple frame of claim 1 further comprising ear pads formed of thermo setting plastic material ahving properties that enable the material to become pliable in the presence of body heat, conforming to the underlying structure in contact with the material, and setting up rigidly thereafter.

5. The device of claim 4 further comprising nose pads, fixedly installed to said eyeglass frame, made from the same thermo setting plastic material as said ear pads.

6. An adjustable eyeglass temple, hingably attached to an eyeglass frame comprising:

(A) a temple having a front hinge adjusting tube and a rear ear piece adjusting tube, said rear ear piece adjusting tube being slidably disposed within said front hinge adjusting tube such that said rear ear piece adjusting tube can telescopically expand therefrom and retract thereto;

(B) adjusting means fixedly installed within said front hinge adjusting tube and removably installed within said rear ear piece adjusting tube such that the overall length of said temple can be shortened or lengthened by said adjusting means, said adjusting means being only accessible for adjustment from the front of said temple;

(C) a cap removably disposed within said front hinge adjusting tube, said cap having a plug portion extending therefrom further into said fron hinge adjusting tube such that said plug portion engages said adjusting means when said cap is depressed into said front hinge adjusting tube;

(D) a spring fixedly attached to said cap such that said spring is disposed within said front hinge adjusting tube, said spring acting to restrain the inward movement of said cap and to restore said cap, after said cap has been depressed, to its original position when said cap is released;

(E) locking means disposed within said read ear piece adjusting tube such that said locking means prevent the rotation of said rear ear piece adjusting tube to prevent inadvertent adjustment of the length of said temple.

7. The device of claim 6 wherein said adjustment means comprise a screw fixedly installed within said front hinge adjusting tube, said screw also being rotatable therein; and female screw threads fixedly installed within said rear ear piece adjusting tube, said female screw threads being engaged by said screw such that as said screw is rotated clockwise, said rear ear piece adjusting tube is drawn into said front hinge adjusting tube, thereby making the overall length of the temple shorter; and when rotated counter-clockwise, said rear ear piece adjusting tube is forced out of said front hinge adjusting tube, thereby making the overall length of the temple longer.

8. The eyeglass temple of claim 6 wherein the locking means comprise forming the shape of the rear adjustable ear piece adjusting tube such that the shape is non-circular and conforming to the shape of the inside of said front hinge adjusting tube.

9. The adjustable eyeglass temple and frame of claim 6 further comprising ear pads formed of thermo setting plastic material having properties that enable the material to become pliable in the presence of body heat, conforming to the underlying structure in contact with the material, and setting up rigidly thereafter.

10. The device of claim 9 further comprising nose pads, fixedly attached to said eyeglass frame, made from the same thermo setting plastic material as that of said ear piece.

11. An adjustable eyeglass temple hingable attached to an eyeglass frame comprising:

(A) A receiver barrel, having a front and a back having a fixed length and also having a width less than said length, forming the general shape of a cylinder having a non-circular geometric form said receiver barrel also being hollow;

(B) An ear piece, having a front and a back, and an inner wall and an outer wall, also being hollow, said ear piece tapering from front to back, and also being generally cylinderical in shape and having a diameter less than the diameter of the receiver, and also having the same non-circular geometric shape as said receiver barrel, said ear piece being slidably disposed with said receiver barrel, thereby forming a tmple, said ear piece also having female threads on the inner walls of said ear piece.

(C) A screw, turnably disposed with the hollow portion of said receiver barrel, said screw having sufficient length to extend byond the back of said receiver barrel, said screw also having threads that match and engage said female threads within said ear piece such that as said screw is rotated clockwise, said ear piece is drawn into said receiver barrel thereby making the overll length of the temple shorter; and when rotated counterclockwise, said ear piece is formed out of said receiver barrel, thereby making the overall length of the temple longer, said screw only being accessible from the front of the receiver barrel;

(D) Restraining means to prevent lateral or transverse movement of said screw within said receiver barrel;

(E) Hinger means fixedly installed to said receiver barrel such that said receiver barrel can be attached to an eyeglass frame;

(F) Concealment means removably disposed and installed within said receiver barrel so as to conceal said screw from view during normal use of the eyeglasses;

(G) Ear pads, fixedly installed in the rear of said ear piece, formed of thermo setting plastic material having properties that enable the material to become pliable in the presence of body heat, conforming to the underlying structure in contact with the material, and setting up rigidly therafter.

12. The eyeglass temple of claim 11 wherein said screw has a square slot.

13. The eyeglass temple and frame of claim 11 wherein said concealment means comprise (A) a cap removably disposed within said receiver barrel, said cap having a plug portion extending therefrom further into said receiver barrel such that said plug portion engages said adjusting means when said cap is depressed into said receiver barrel;

(B) a spring fixedly attached to said cap such that said spring is disposed within said receiver barrel, said spring acting to restrain the inward movement of said cap and to restore said cap, after said cap has been depressed, to its original position when said cap is released.

14. The device of claim 11 further comprising nose pads, fixedly attached to said eyeglass frame, made from the same thermo setting plastic material as that of said ear pads.

15. The device of claim 14 wherein said ear pads and said nose pads are formed of oil filled membranes.

* * * * *